Patented May 20, 1947

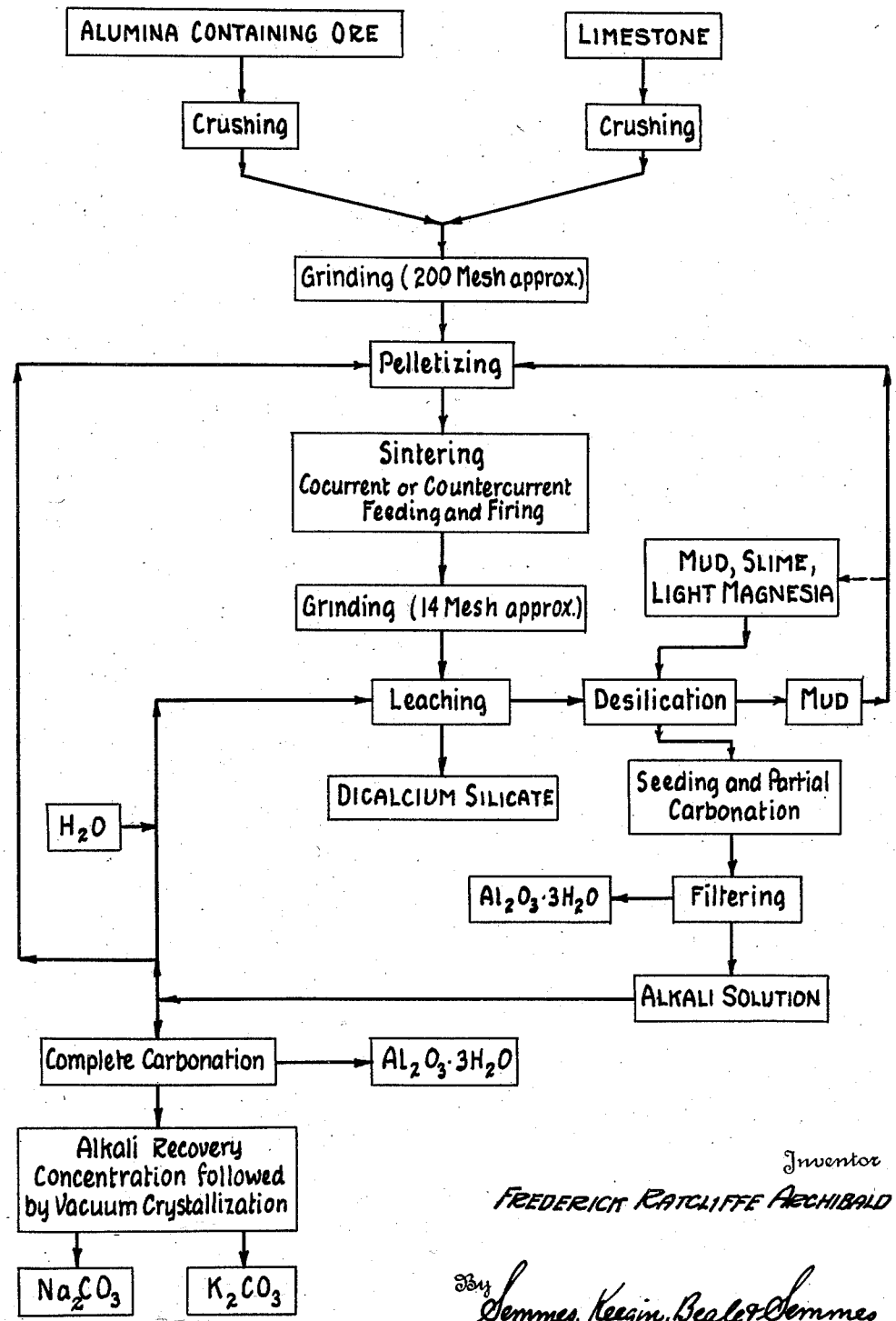

2,420,852

UNITED STATES PATENT OFFICE 2,420,852

RECOVERY OF ALUMINA FROM ORES

Frederick Ratcliffe Archibald, Beverly, Mass., assignor to Nepheline Products Limited, Lakefield, Ontario, Canada, a company of Canada Application September 24, 1942, Serial No. 459,587

18 Claims. (Cl. 23—141)

This invention relates to the treatment of siliceous aluminous material and particularly ores containing nephelite and nepheline syenite.

An object of this invention is to provide a method of extracting alumina from nephelite, nepheline syenite and other alumina-silica containing ores, slags and dusts.

Another object of this invention is to provide a method of extracting alumina from nephelite, nepheline syenite, and other alumina-silica containing ores, in which the ore is ground and mixed with limestone; the mixture is sintered by passing the same concurrently with fuel through a sintering furnace; the sintered mass is leached and the resulting solution treated.

Still another object of this invention is to provide a method of extracting alumina from nephelite and nepheline syenite and other alumina-silica containing ores in which the ore is finely ground and mixed with limestone, treated to form pellets and in which the pellets are sintered to form a mass for further treatment by leaching to separate aluminum containing constituents therefrom.

A further object of this invention is to provide a method of extracting alumina from nephelite, nepheline syenite and other alumina-silica containing ores in which the ore is ground, mixed with limestone, pelletized, sintered, crushed and ground, leached, and the solution obtained by leaching is treated for separation of silica therefrom and then treated for separation of alumina, and wherein the solution from which the alumina is separated is utilized as a leaching medium.

A still further object of this invention is to provide a method of extracting alumina from ores containing aluminum in which a solution is obtained by leaching sintered, pelletized ore and limestone mixtures and after desilication is treated by seeding with carbonation to separate alumina therefrom and in which some of the remaining solution is returned to the crushed and ground original ore prior to pelletizing and sintering.

Yet another object of this invention is to provide a method of sintering aluminum bearing ore and limestone to prepare the same for leaching in which the material to be sintered and the fuel for heating the material are passed co-currently through a sintering furnace.

It is also an object of this invention to provide improved methods for separating silica from a solution resulting from the leaching of a sintered mixture of an aluminum and silicon containing ore and limestone.

Another object of this invention is to provide improved methods of recovering alumina from aluminate solutions containing silica, potash and soda.

A further object is to supply or increase the soda content of the raw mixture by returning part of the barren alkali solution to the pelletizing step.

With these and other objects in view, the invention resides in the steps and procedures set forth hereinafter as will more fully appear.

In order to facilitate the understanding of this invention, reference is made to the drawings in which is illustrated a flow sheet of the process of the invention.

While the present invention will be described with particular reference to the treatment of nephelite, the process may be applied to the extraction of alumina having a low silica content from any siliceous aluminous material. For instance, other commercially feasible applications may be the use of this process in connection with the Bayer process for the treatment of a high silica bauxite; and more particularly for the extraction of alumina of low silica content from the "red mud" which at the present time is a waste product from the Bayer process. The raw material is referred to herein as an "ore," but this word is to be accorded a broad interpretation and includes rocks, clays, slags, dusts, sands, slimes, and any other form of siliceous aluminous material.

In carrying out the present invention, raw materials such as nepheline syenite or other alumina-silica containing ores are crushed and ground with high calcium limestone after the latter has been crushed. The mixture should be ground so that approximately 80% of the same could pass through a 200 mesh screen. Either dry or wet grinding may be utilized.

The proportions of the siliceous aluminous material and the limestone will vary depending upon the silica content and the amount of alkali present in the siliceous aluminous material and upon the available lime in the limestone.

For instance, when nepheline syenite is used as the siliceous aluminous material, the proportion of nepheline syenite and limestone to be used are based upon the silica requirements alone. That is, for each mol of $SiO_2$ in the mixture there must be 2 mols of CaO present. For example, the raw materials for the process may have the following composition:

|  | Nepheline Rock | Limestone |
|---|---|---|
| $Al_2O_3$ | 28.0 |  |
| $SiO_2$ | 42.8 | 2.8 |
| $Na_2O$ | 12.0 |  |
| $K_2O$ | 4.0 |  |
| $CaCO_3$ |  | 94.3 |
| Net $CaCO_3$ |  | 85.0 |

In this case, each 100 tons of raw mixture should contain 37.3 tons of nepheline rock and 62.7 tons of limestone.

When clay is used as the siliceous aluminous material, the alkali content is far below the requirements for formation of sodium aluminate and in this case it is necessary to add more limestone than is the case of nepheline syenite to make up the deficiency in alkali so that in the resulting mixture, $Al_2O_3$ not taken care of by alkali oxides will be taken care of by addition of approximately 1.5 mols CaO per mol $Al_2O_3$.

The following is an example which gives the proportions of kaolin and limestone when the former is used as the siliceous aluminous material:

|  | Kaolin | Limestone |
|---|---|---|
| $Al_2O_3$ | 38.97 |  |
| $SiO_2$ | 43.23 | 2.0 |
| $Na_2O$ | 0.15 |  |
| $K_2O$ | 0.09 |  |
| $CaCO_3$ |  | 93.0 |
| Net $CaCO_3$ |  | 86.3 |

In this case each 100 tons of raw mixture should contain 30 tons of kaolin and 70 tons of limestone.

It has been found that sintering of the mixture of the ore and limestone can be more effectively accomplished if the ground mixture is first converted into the form of pellets before introducing the same into the sintering furnace. By following this procedure, the sintering is quicker and the formation of large lumps is avoided.

The pelletizing can be effected by mixing controlled quantities of water with the ground material and tumbling the mass. If dry grinding has been employed, the mixture should be wetted slightly and rolled in a drum or mixer until it has formed into pellets. On the other hand, if the grinding has been effected under wet conditions the drying and pelletizing operations may be performed in a rotary dryer. In any event, the finely ground mixture of ore and limestone is treated to convert the same into the form of pellets. In place of utilizing water as a medium for wetting the dry ground mixture of raw materials for conversion into pellets I prefer to utilize barren leaching solution which has a fairly high content of soda ash. I find that the alkali solution increases the hardness of the pellets, and furthermore reduces the temperature and time necessary in the subsequent sintering step. Also, in the case of iron-bearing ores especially, the use of the alkali addition improves recovery of the alumina. This appears to be due to the inhibiting effect of the alkali toward the formation of iron-aluminum silicates.

After the mixture of ore and limestone has been pelletized, it is passed through a sintering furnace in which the temperature preferably does not exceed 2400° F. In actual practice, the sintering of nepheline syenite ores which have been pelletized by the use of alkali solution is effected at temperatures of 2150° F. to 2250° F. On the other hand, kaolin requires a temperature of 2400° F.

The purpose of this sintering step is to convert the aluminum of the ore to a soluble form and to render the silica insoluble during the subsequent leaching treatment. The chemical reaction in the case of nephelite would be as follows:

(1) 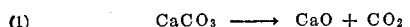
$$CaCO_3 \longrightarrow CaO + CO_2$$

(2) 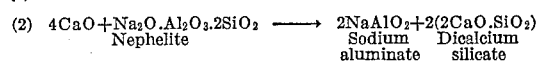
$$4CaO + Na_2O \cdot Al_2O_3 \cdot 2SiO_2 \longrightarrow 2NaAlO_2 + 2(2CaO \cdot SiO_2)$$
Nephelite — Sodium aluminate — Dicalcium silicate Completion of this chemical reaction is indicated by easily recognizable physical characteristics of the material, such as shrinkage in volume, change in color, and evidence of approaching incipient fusion.

It has been found that an elongated rotary kiln is particularly useful for large scale operation. The sintering may be effected on the so-called counter current principle in which the fuel is passed through the furnace or kiln in a direction opposite to that in which the pellets of ore and limestone are passed. On the other hand, I have found it preferable to carry out the sintering on what may be termed a co-current feeding and firing, that is, the sintering may be effected by passing the fuel for supplying heat and the material to be sintered through the sintering furnace in the same direction.

In pilot plant tests results have been obtained with one pass of the material co-currently through the furnace which are equivalent to those from two or three passes when operating on the counter current method. It has been found that the method of firing the kiln co-currently with the feed results in the following advantages:

(1) A more logical balance of endothermic and exothermic reactions in relation to heat transfer.

(2) For a given range of temperature within which the desired reactions will take place, a much greater length of kiln can be kept within the range if fired co-currently. This means that, accepting a definite time interval for reaction, the kiln would have much greater capacity if fired co-currently. This would be accomplished by increasing the feed rate, slope and rate of turning.

(3) Ease of control, in the case of co-current firing, results from the fact that the reactions requiring most heat are performed at the area of greatest heat transfer.

(4) More rapid heat transfer to charge entering kiln, further shortening the required kiln length.

(5) Reduction in radiation heat loss due to shortening of kiln and increase in capacity per unit diameter.

(6) *Reduction in dust loss.*—This is an important feature and is very striking in actual trials in a small kiln. When the proper sintering temperature is reached using co-current firing, the decomposition of calcium carbonate and the silicate reaction apparently occur almost simultaneously. Fine particles are immediately sintered and adhere to the main charge so that no unburned dust escapes with the exit gases.

(7) Elimination of "case-hardening" by early and slow surface sintering.

By utilizing a co-current firing, a shorter kiln than would be necessary in the case of counter-current firing may be used. As a result of using a short kiln, the exit gases are hotter than in the case of a longer kiln. The heat from the hot gases from the short co-currently fired kiln can be utilized for preheating the raw charge in a suitable furnace or may be partially recovered in waste heat boilers before use in preheating the charge. This results in heat economy which adds to the total economy of the process.

It has been found that results are more satisfactory if a reducing atmosphere is maintained in the sintering kiln or at least by maintaining conditions such as to avoid excessive oxidation. This is accomplished by the use of a minimum of excess air for combustion purposes.

After sintering of the pellets of ore and limestone has been completed, the sintered material is ground to a size that will permit satisfactory handling of pulps, that is, to a size which will pass through at least a 14 mesh sieve. The ground material is then subjected to a leaching treatment in which the material is passed countercurrent to a solution from a previous leaching cycle which has been impoverished of alumina and diluted to the required alkali content before re-use. Maximum recovery of alumina and minimum dissolution of silica are accomplished by controlling the leaching solution with respect to content of free alkali and total sodium carbonate. For instance, in one case the actual composition of diluted barren solution returned for leaching contained 14.4 grams per liter free caustic (NaOH) and 51.3 grams per liter total alkali ($Na_2CO_3$).

By carrying out the leaching operation at a temperature of about 125° F. best results are obtained; above this temperature the dissolution of silica is increased and below it, the extraction of alumina decreases.

The leaching may be effected for a period of time varying from 20 to 60 minutes. A 30 minute extraction treatment is adequate in most instances. In the final stage of leaching the solution is brought to a concentration in which approximately 80 to 100 grams of $Al_2O_3$ are present for each liter of solution.

After obtaining a solution having an alumina content as set forth above such solution is passed to a stage in which desilication is effected. For this purpose it is preferred to utilize pressure equipment in which the solution is subjected to a temperature above 212° F. to reduce the silica content to a value within the required limits. The pregnant solution containing a regulated amount of fine slime in suspension and adjusted to a low free alkali content is charged into a pressure tank and heated to a temperature in excess of 300° F. Agitation may be effected but is not essential. The solution is maintained under treatment for a time depending upon the temperature used. At 320° F. the time required is about one hour, whereas, for example, at 360° F. the time required is about one-half hour.

In desilication of the solution, adjustment of the alkali balance should be considered. In general, the lower the amount of free alkali the better the desilication treatment, but at the same time some free alkali must be maintained in order to prevent premature precipitation of alumina. For instance, in pilot plant operation, a pregnant solution containing 93.3 grams per liter of alumina contained 12.5 grams per liter free alkali (NaOH). The reduction in free alkali may be effected by dilution and partial carbonation of a re-circulated solution before re-use in leaching and/or by careful carbonation of the pregnant solution before desilication.

It is important to carry out the desilication at elevated temperatures because my theory is that the silica molecules or aggregates are thereby dehydrated and deposited, carrying with them small amounts of alumina hydrate and alkali. The material thus precipitated I term "white mud" and is returned to the pelletizing stage in order that the contained alumina may be recovered. The hydration and stabilization of silica at lower temperatures is aided and maintained by the presence of alkali. At temperatures only slightly above the boiling point (230° F.), the silica will be partially dehydrated and deposited as a gelatinous mass. At still higher temperatures the dehydration is more complete.

It is also within the concept of the present invention to utilize addition agents for aid in collecting and the deposition of silica during the heat treatment. The most satisfactory agent for this purpose is light magnesium oxide.

Another agent which may be added to the solution is the fine slime from the leaching operation. The use of the slimes from the leaching operation results from applicant's conception that the aluminate solutions are colloidal, particularly with respect to silicate content. The fine slime serves both as a colloidal collector and as an adsorption medium. As a colloid itself the fine slime serves as a precipitant for the colloidal silicate. Furthermore, the fine particles in the slime serve as centers for adsorption and possibly chemical reaction with the silicate.

In accordance with the present invention, the use of the fine slimes from the leaching treatment as an aid for desilication permits a further simplification and economy in that the necessity for complete filtration or removal of the slimes from the leaching solution is avoided. This is quite an economy in that savings in filtration costs are appreciable. Of course, the fine slimes might be removed prior to desilication and then reintroduced into the solution, but this would not be as economical as in the case in which they are left in the leaching solution.

It has also been found that use can be made of activated or re-dried mud filtered off after the desilication treatment as an agent for removal of silica in treatment of a new batch of solution. This is particularly valuable when magnesia is used, as the excess magnesia added to the first batch can be returned with the rest of the mud filtered off after the desilication, thus reducing the required addition of magnesia in subsequent batches.

Further colloidal addition agents may be utilized which include starch, ferric hydroxide, and activated alumina, particularly in a finely divided physical state. While these substances are not indispensable, they are effective.

The reduction of the silica content is essential to the recovery of alumina of high grade and by reducing the silica content to a very low value by the use of magnesia, for example, the alkali chemically held by the silica content of the alumina product is also reduced. This is particularly important in view of the objections to the presence of potash in alumina produced from nepheline syenite. By the use of magnesia, the silica and chemically held alkalies can be reduced so low that the alumina can meet very rigid specifications. The alkali not held in the product by the silica can be washed out to practical completeness. By my process I have produced alumina containing 0.006% of $SiO_2$ (calcined basis) and only spectrographic traces of potash.

Some results of the use of addition agents in the desilication treatment are given in the following examples:

1. Using light magnesium oxide as addition agent, the silica content of the alumina produced (calcined basis) can be reduced to a trace by use of 20 lb. MgO per ton of solution; and to less than 0.015% by the use of 10 lb. MgO per ton solution when the pressure treatment is carried out at a temperature corresponding to a pressure of 10 atmospheres for ½ hour. The consumption of MgO can be reduced by employing smaller quantities in conjunction with addition of fine slime or other cheaper agents, and by re-using some of the mud from one pressure cycle in a subsequent cycle.

2. Fine slime from the leaching operation added to the extent of 6–10 lbs. per ton will result, after autoclaving and precipitation, in an alumina product containing less than 0.05% $SiO_2$.

3. Boiled starch in the proportion of 0.2 lb. per ton of solution is a valuable addition.

4. Calcined powdered dolomite to the amount of 10–20 lbs. per ton of solution will give good desilication results. Lesser quantities can be used in conjunction with the use of fine slime from the process itself.

After the removal of the silica the solution is treated for recovery of alumina. Alumina may be removed from the solution by combined application of seeding and carbonation with carbon dioxide gas. The carbon dioxide gas may be recovered from kiln gases. In the present process, carbonation is not utilized as a means of precipitating alumina but as a means for reducing the free sodium hydroxide concentration so that the seeding operation may proceed. It has been suggested that if a pregnant solution of sodium aluminate is seeded long enough it is possible to get about 75% removal of alumina. By careful reduction of the sodium hydroxide produced in the process of seeding by addition of carbon dioxide, it is possible to obtain about 91% removal of alumina. Care should be taken to avoid carrying the carbonation to a point where alumina hydrate is thrown out by carbonation. It appears that the alumina is not present in true solution as sodium aluminate, but rather exists as hydrated molecules or aggregates of alumina dispersed with sodium hydroxide. The results of seeding may be expressed as follows:

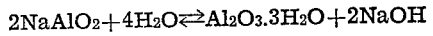

$$2NaAlO_2 + 4H_2O \rightleftarrows Al_2O_3.3H_2O + 2NaOH$$

According to the colloidal or dispersion theory the results of seeding may be expressed as follows:

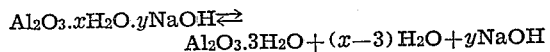

$$Al_2O_3.xH_2O.yNaOH \rightleftarrows Al_2O_3.3H_2O + (x-3)H_2O + yNaOH$$

The left hand side of the equation represents molecular aggregates dispersed in water and usually mistaken for true solutions. They are unstable after cooling and aging, and if small particles of alumina hydrate ($Al_2O_3.3H_2O$) are added to serve as centers of growth the action is displaced to the right as illustrated.

Whichever interpretation is assumed, the result is the removal of alumina from the solution in the form of hydrate (solid) and an increase in the concentration of sodium hydroxide. By the use of carbonation the concentration of sodium hydroxide can be regulated as the reaction goes to the right so that the seeding may proceed by the reduction of the concentration of the sodium hydroxide. Care should be taken, however, to keep the free sodium hydroxide concentration above 20 grams per liter as below this figure alumina hydrate would precipitate rapidly and in a finely divided state carrying silica with it.

Thus, the seeding operation produces free sodium hydroxide which tends to keep the silica in solution and by controlled carbonation the amount of sodium hydroxide produced is likewise controlled so that the silica will not be thrown out of solution.

The sintering of the aluminum containing ore with the limestone and the subsequent leaching thereof results in the presence in the solution of a quantity of alkali oxides removed along with the alumina from the raw material. About equimolecular proportions of alkali oxides and the alumina are present in nepheline syenite. This results in a fairly large excess of alkalies from each cycle of operation. After desilication of the leaching solution and the treatment thereof for separation of alumina, the waste solution may be treated for recovery of alkalies. Part of the barren solution may be further carbonated for separation of unremoved portions of alumina and the resulting alkaline solution treated for recovery of alkalies in any suitable manner.

For instance, the barren alkaline solution may be concentrated to a point at which crystallization of sodium carbonate mono-hydrate occurs. By further evaporation in vacuum crystallizing pans the salt may be finally removed. The potassium carbonate will remain in solution and it can be recovered sufficiently pure for soil fertilization purposes by evaporating the solution to dryness after removal of the sodium carbonate mono-hydrate.

Of the total barren solution a portion thereof is recirculated for use as a leaching liquid and for this purpose it may be diluted with water or washings so as to adjust the alkali balance in the leaching treatment.

Another portion of the barren alkali solution may be utilized for wetting the finely ground mixture of ore and limestone for purposes of pelletizing the same prior to sintering. This barren solution which is thus introduced into the mixture of ore and limestone prior to sintering serves as a means for introducing soda into the charge of material to be sintered. As stated, the use of the alkali solution in place of water causes the pellets of the finely ground ore and limestone to be harder than if formed by using water and the pellets do not crumble in the kiln. Furthermore, the addition of alkali solution to the material prior to pelletizing results in an increased extraction of alumina in the subsequent process.

As a result of adding the barren solution to the finely ground mixture of ore and limestone in place of water alone, the following advantages are obtained:

1. The reaction temperature is reduced.
2. The recovery of alumina is increased.
3. The pellets are harder and there is less dust during the treatment.
4. The sintered product is more easily disintegrated obviating some, or all, of the grinding required on the straight all-lime sintered product.
5. A convenient method of returning the spent seeded or barren alkali liquid to the process without going through an evaporation step is provided.

A satisfactory amount of soda addition is about 10% of the weight of the ore used. It is, of course, advantageous to add the alkaline solution even when less than 10% of soda is used.

While the present invention has been described in connection with certain specific embodiments of the inventive concept and reference has been made to certain details of steps, conditions and reagents, it should be understood that the scope of this invention is not to be limited thereto but to be determined by the appended claims.

I claim:

1. A method of treating aluminum containing material comprising tumbling a mixture of finely ground aluminum-containing material and lime- 1. stone and an alkaline reacting solution of an alkali metal compound to form pellets, sintering the pellets to convert the aluminum into a soluble salt, crushing the sintered pellets, leaching the crushed pellets, separating alumina from the solution and utilizing a portion of the remaining solution as the alkaline reacting solution for pelletizing fresh mixtures of aluminum-containing material and limestone.

2. In the recovery of alumina from aluminum-containing material the steps of forming pellets of a mixture of finely ground aluminum-containing material and limestone and an alkaline reacting solution of an alkali metal compound, and passing the pellets of aluminum-containing material and limestone through an elongated rotary sintering furnace co-currently with a heating medium.

3. A method of treating aluminum containing material comprising tumbling a mixture of finely ground aluminum-containing material and limestone and an alkaline reacting solution of an alkali metal compound to form pellets, passing a mixture of the aluminum-containing material and limestone in pellet form through an elongated rotary sintering furnace co-currently with a heating medium to convert the aluminum into a soluble salt, crushing the sintered pellets, leaching the crushed pellets, separating alumina from the solution and utilizing a portion of the remaining solution as the solution for pelletizing fresh mixtures of aluminum-containing material and limestone.

4. A method of treating aluminum-containing material comprising tumbling a mixture of finely ground aluminum-containing material and limestone and an alkaline reacting solution of an alkali metal compound to form pellets, sintering the pellets to convert the aluminum into a soluble salt, crushing the sintered pellets, leaching the crushed pellets, separating alumina from the solution and utilizing a portion of the remaining solution as a leaching medium.

5. A method of treating aluminum-containing material comprising tumbling a mixture of finely ground aluminum-containing material and limestone and an alkaline reacting solution of an alkali metal compound to form pellets, sintering the pellets to convert the aluminum into a soluble salt, crushing the sintered pellets, leaching the crushed pellets, separating alumina from the solution and utilizing a portion of the remaining solution for pelletizing fresh mixtures of aluminum-containing material and limestone and another portion of the remaining solution as a leaching medium.

6. A method of treating aluminum-containing material comprising tumbling a mixture of finely ground aluminum-containing material and limestone and an alkaline reacting solution of an alkali metal compound to form pellets, sintering the pellets to convert the aluminum into a soluble salt, crushing the sintered pellets, leaching the crushed pellets, separating silica and alumina from the solution and utilizing a portion of the remaining solution for pelletizing fresh mixtures of aluminum-containing material and limestone.

7. A method of removing silica from an alumina enriched alkali metal aluminate solution comprising adding a light magnesium oxide to the solution and heating said solution to a temperature above 212° F. for a time sufficient to effect deposition of silica.

8. A method of treating alumina containing material comprising tumbling a mixture of a finely ground aluminum-containing material and limestone and an alkaline reacting solution of an alkali metal compound to form pellets, sintering the pellets to convert the alumina into a soluble salt, crushing the sintered pellets, leaching the crushed pellets, separating alumina from the solution, recovering alkali from the remaining solution, utilizing a portion of the remaining solution as the alkaline solution for pelletizing fresh mixtures of aluminum-containing material and limestone and utilizing a further portion of the remaining solution as a leaching agent.

9. In the recovery of alumina from aluminum-containing material the steps of tumbling a mixture of finely ground aluminum-containing material and limestone and an alkaline reacting solution of an alkali metal compound to form pellets, and passing the pellets of aluminum-containing material and limestone through a sintering furnace.

10. A method of treating aluminous siliceous material comprising tumbling a finely ground mixture of the material with limestone and an alkali reacting alkali-metal compound solution to form pellets, sintering the pellets by passing them through an elongated rotary sintering kiln cocurrently with a heating medium to convert the aluminum into a soluble compound, leaching the sintered mass with an alkaline reacting alkali-metal compound solution to obtain an alkali-metal aluminate solution, heating the solution in the presence of a silica precipitating agent to effect the precipitation of soluble silica contained therein, separating the precipitated silica, seeding the remaining solution to effect auto-precipitation of aluminum hydrate, carbonating the solution during precipitation at a rate to maintain the free sodium hydroxide content above 20 grams per liter but at a value low enough to avoid throwing silica out with the precipitated alumina hydrate, and utilizing the remaining barren solution as the solution employed in pelletizing and leaching.

11. A method of treating aluminous siliceous material comprising tumbling a finely ground mixture of the material with limestone and an alkaline reacting alkali-metal compound solution to form pellets, sintering the pellets by passing them through an elongated rotary sintering kiln cocurrently with a heating medium to convert the aluminum into a soluble compound, leaching the sintered mass with an alkaline reacting alkali-metal compound solution to obtain an alkali-metal aluminate solution, heating the solution in the presence of finely divided magnesium oxide to effect the precipitation of soluble silica contained therein, separating the precipitated silica, seeding the remaining solution to effect auto-precipitation of aluminum hydrate, carbonating the solution during the precipitation at a rate to maintain the free sodium hydroxide content above 20 grams per liter but at a value low enough to avoid throwing silica out with the precipitated alumina hydrate, and utilizing the remaining barren solution as the solution employed in pelletizing and leaching.

12. A method of treating nepheline syenite for the extraction of alumina therefrom comprising tumbling a finely ground mixture of nepheline syenite with limestone and an alkaline reacting alkali-metal compound solution to form pellets, sintering the pellets by passing them through an elongated rotary sintering kiln cocurrently with a heating medium to convert the aluminum into a soluble compound, leaching the sintered mass with an alkaline reacting alkali-metal compound solution to obtain an alkali-metal aluminate solution, heating the solution in the presence of a silica precipitating agent to effect the precipitation of soluble silica contained therein, separating the precipitated silica, seeding the remaining solution to effect auto-precipitation of aluminum hydrate, carbonating the solution during precipitation at a rate to maintain the free sodium hydroxide content above 20 grams per liter but at a value low enough to avoid throwing silica out with the precipitated alumina hydrate, and utilizing the remaining barren solution as the solution employed in pelletizing and leaching.

13. A method of treating nepheline syenite for the extraction of alumina therefrom comprising tumbling a finely ground mixture of nepheline syenite with limestone and an alkaline reacting alkali-metal compound solution to form pellets, sintering the pellets by passing them through an elongated rotary sintering kiln cocurrently with a heating medium to convert the aluminum into a soluble compound, leaching the sintered mass with an alkaline reacting alkali-metal compound solution to obtain an alkali-metal aluminate solution, heating the solution in the presence of finely divided magnesium oxide to effect the precipitation of soluble silica contained therein, separating the precipitated silica, seeding the remaining solution to effect auto-precipitation of aluminum hydrate, carbonating the solution during the precipitation at a rate to maintain the free sodium hydroxide content above 20 grams per liter but at a value low enough to avoid throwing silica out with the precipitated alumina hydrate, and utilizing the remaining barren solution as the solution employed in pelletizing and leaching.

14. In the recovery of alumina from aluminum-containing materials, the step of passing a mixture selected from the group consisting of (1) the aluminum-containing material and limestone, and (2) the aluminum-containing material, an alkaline reacting solution of an alkali metal component and limestone through an elongated rotary sintering furnace cocurrently with a heating medium to raise it to a temperature at which di-calcium silicate and an alkaline aluminate will form in the sinter but below that at which undesirable alumino-silicates and silicates having hydraulic setting properties are formed, and continuing heating at a temperature not above said first-mentioned temperature until formation of di-calcium silicate and said aluminate in the sinter is completed.

15. In the recovery of alumina from aluminum-containing material, the steps of preheating a mixture selected from the group consisting of (1) the aluminum-containing material and limestone, and (2) the aluminum-containing material, an alkaline reacting solution of an alkali metal component and limestone, and then passing the preheated mixture through an elongated rotary sintering furnace cocurrently with a heating medium to raise it to a temperature at which di-calcium silicate and an alkaline aluminate will form in the sinter, but below that at which undesirable alumino-silicates and silicates having hydraulic setting properties are formed, and continuing heating at a temperature not above said first-mentioned temperature until formation of di-calcium silicate and said aluminate in the sinter is completed.

16. In the recovery of alumina from nepheline syenite ore, the steps of mixing such ore with limestone, passing the mixture cocurrently with a heating medium through a heating zone, applying heat to the material upon its entrance into said zone to raise it to a temperature at which di-calcium silicate and sodium aluminate will form in the sinter, but below that at which undesirable alumino-silicates and silicates having hydraulic setting properties are formed, and continuing heating at a temperature not above said first-mentioned temperature until formation of di-calcium silicate and said aluminate in the sinter is completed.

17. In the recovery of alumina from a siliceous aluminous material containing the same, the step of passing a mixture of the material and limestone through an elongated rotary sintering furnace cocurrently with a heating medium to raise it to a temperature at which di-calcium silicate is formed and the alumina is combined with the calcium oxide of the limestone in the sinter but below that at which undesirable alumino-silicates and silicates having hydraulic setting properties are formed, and continuing heating at temperatures not above said first-mentioned temperature until formation of the di-calcium silicate and the combination of alumina and calcium oxide is completed.

18. In the recovery of alumina from a clay containing the same, the step of passing a mixture of the clay and limestone through an elongated rotary sintering furnace cocurrently with a heating medium to raise it to a temperature at which di-calcium silicate is formed and the alumina is combined with the calcium oxide of the limestone in the sinter but below that at which undesirable alumino-silicates and silicates having hydraulic setting properties are formed, and continuing heating at temperatures not above said first-mentioned temperature until formation of the di-calcium silicate and the combination of alumina and calcium oxide is completed.

FREDERICK RATCLIFFE ARCHIBALD.

REFERENCES CITED

The following references are of record in the file of this patent:

UNITED STATES PATENTS

| Number | Name | Date |
| --- | --- | --- |
| 1,616,674 | Barnitt | Feb. 8, 1927 |
| 1,422,004 | Sherwin | July 4, 1922 |
| 1,137,860 | Howard | May 4, 1915 |
| 1,971,354 | Scheidt | Aug. 28, 1934 |
| 2,280,998 | Brown | Apr. 28, 1942 |
| 1,775,313 | Lellep | Sept. 9, 1930 |
| 1,283,483 | Dwight et al. | Nov. 5, 1918 |
| 1,091,230 | Messerschmitt | Mar. 24, 1914 |

FOREIGN PATENTS

| Number | Country | Date |
| --- | --- | --- |
| 252,399 | Great Britain | June 9, 1927 |